(12) United States Patent
Gerhart et al.

(10) Patent No.: US 7,230,700 B2
(45) Date of Patent: Jun. 12, 2007

(54) SIMULTANEOUS 4-STOKES PARAMETER DETERMINATION USING A SINGLE DIGITAL IMAGE

(75) Inventors: Grant R. Gerhart, Bloomfield Hills, MI (US); Roy M. Matchko, Payson, AZ (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/527,655

(22) Filed: Sep. 25, 2006

(65) Prior Publication Data

US 2007/0041014 A1 Feb. 22, 2007

Related U.S. Application Data

(62) Division of application No. 10/822,355, filed on Apr. 13, 2004, now Pat. No. 7,173,698.

(51) Int. Cl.
*G01J 4/00* (2006.01)
(52) U.S. Cl. ..................................... 356/364
(58) Field of Classification Search ............... None
See application file for complete search history.

(56) References Cited

U.S. PATENT DOCUMENTS

| | | | |
|---|---|---|---|
| 3,759,618 A | 9/1973 | Rogers et al. | |
| 5,396,329 A | 3/1995 | Kalawsky | |
| 6,061,091 A * | 5/2000 | Van de Poel et al. | 348/241 |
| 6,339,426 B1 * | 1/2002 | Lui et al. | 345/467 |
| 6,373,614 B1 | 4/2002 | Miller | |
| 6,393,145 B2 * | 5/2002 | Betrisey et al. | 382/162 |
| 6,552,836 B2 | 4/2003 | Miller | |
| 6,721,050 B2 | 4/2004 | Vecer et al. | |

* cited by examiner

*Primary Examiner*—Tu T. Nguyen
(74) *Attorney, Agent, or Firm*—David L. Kuhn; Thomas W. Saur; Luis Miguel Acosta

(57) ABSTRACT

A method for determining and displaying polarization profiles of points in a scene from a single imaging detector array, which utilizes a filter system comprised of a retarder, four linear polarizers, four lenses, a color filter, camera lens and CCD video camera. Light from points in a scene are transmitted through the system and exits with attenuated intensities unique for each wavelength of the light. A narrowband color filter selects the wavelength of interest. The four lenses in the system produce four images of the scene, which are recorded as a single CCD-image. The attenuated intensities in each of the four scene-images are used to calculate the Stokes parameters for selected points in the scene for the selected wavelength. A computer program separates the four scene-images in the CCD-image, crops, registers them and calculates the Stokes parameters for each point in the cropped scene.

3 Claims, 5 Drawing Sheets

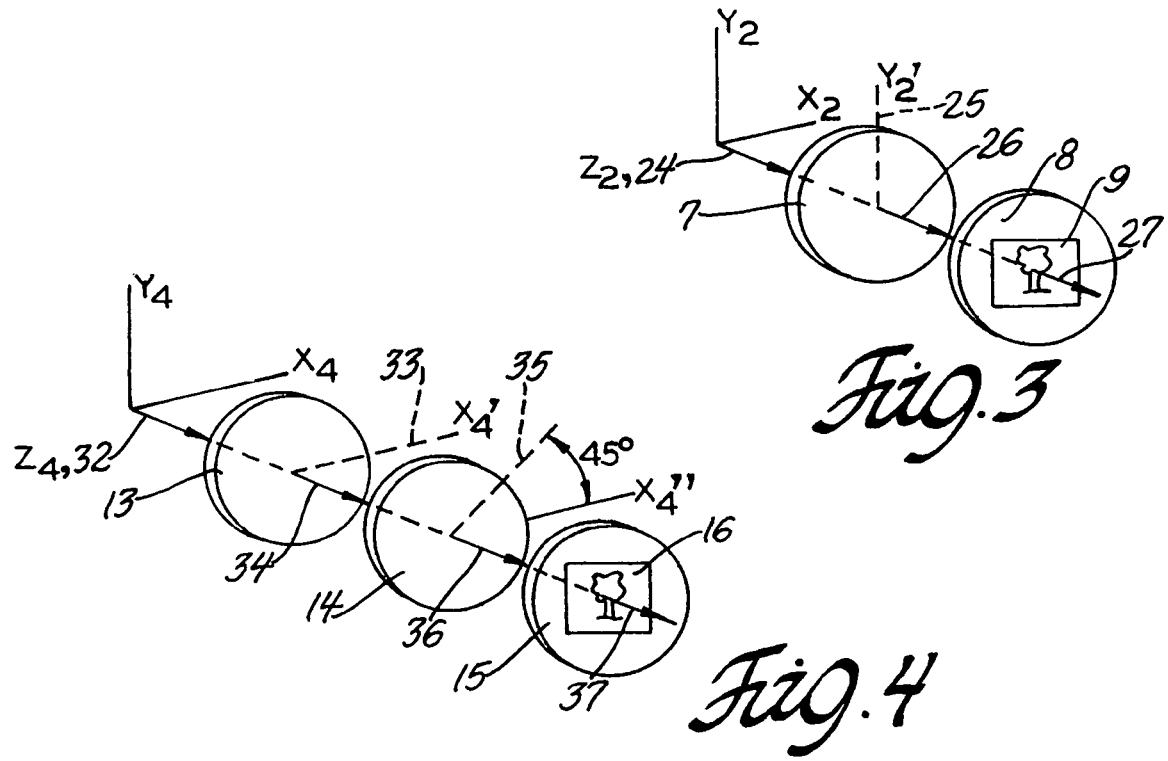

SIMULTANEOUS 4-STOKES PARAMETER DETERMINATION USING A SINGLE DIGITAL IMAGE

CROSS-REFERENCE TO RELATED APPLICATIONS

This application is a divisional application of application Ser. No. 10/822,355, filed Apr. 13, 2004, now issued as U.S. Pat. No. 7,173.698.

GOVERNMENT USE

The invention described here may be made, used and licensed by the or for the U.S. Government for governmental purposes without paying us any royalty.

BACKGROUND

A seminal method to determine the state of polarization of a light beam using measurable quantities is the Stokes method, which involves four independent intensity measurements of the light beam. Each measurement corresponds to the intensity of the beam after it passes through each of four different filter system arrangements. The four Stokes parameters, sometimes called $S_0$, $S_1$, $S_2$ and $S_3$, are derived from these four measured intensities and form a four-element column vector in four-dimensional mathematical space.

Since the discovery of the Stokes method in 1852, many filter systems based thereon have been presented. Extracting polarization information from images is not new either. However, four separate images are used to calculate the Stokes parameters for each element in a scene. To date, a major problem still exists in using the Stokes method for acquiring polarization information from images. The problem occurs because it takes time to capture separate images. In the time it takes to acquire each image, the intensity or polarization state of points in the scene may change. This time factor would affect polarization measurements taken outdoors where changing sun position or cloud conditions would change the intensity or polarization state of the light entering the filter system. In the laboratory, temperature, pressure, density or concentration variations associated with scene elements may change the polarization state of the light entering the filter system during the time required to record four separate images.

PRIOR ART

A relevant item of prior art is a patent to G. R. Gerhart and R. M. Matchko, "Method of Determining Polarization Profiles for Polychromatic Sources." U.S. Pat. No. 5,734,473, issued Mar. 31, 1998.

SUMMARY

Our method and apparatus for determining and displaying polarization profiles of a scene from a single digital image employs a four-system filter-imaging array. Each of the four systems attenuates the intensity of the light transmitted through it and creates an image of the scene. The four systems operate done simultaneously in real time. Three of the four systems consist of a linear polarizer positioned in front of an imaging lens. The other system consists of a retarder and a linear polarizer positioned in front of an imaging lens. The relative positions of the transmission axes of the linear polarizers and the fast axis of the retarder determine the attenuation of the intensity of the light transmitted through each of the four systems. A CCD (Charged Coupled Device) video camera, fitted with a narrow band color filter and camera lens, simultaneously captures and records the four images produced by the four-system filter-imaging system. Each CCD video frame consists of four attenuated images of the scene. A computer program crops and registers selected corresponding elements from each scene-image. Each of the four-cropped images consists of a rectangular array of pixel values (a matrix) corresponding to the attenuated intensities of the light transmitted through each filter. A calibration equation converts pixel values in each of the four matrices to optical densities and then to relative intensities. The Stokes parameters are calculated for each pixel in the scene. Polarization parameters such as the degree of polarization, polarization azimuth angle and polarization ellipticity angle can be calculated for each pixel from the Stokes parameters associated with each pixel value. A unique pseudo-color scheme that utilizes the Poincarè sphere is used for encoding and displaying polarization parameters in the scene. The method associates RGB values with the normalized values of the Stokes parameters. Our apparatus, method and polarization-encoding scheme allows one to create video images of changing polarization parameters in real time.

BRIEF DESCRIPTION OF THE DRAWINGS

FIG. 2 is a diagram showing light from the scene being attenuated by the first system, which is comprised of a linear polarizer with a horizontal transmission axis. It also shows the image formation of the first system.

FIG. 3 is a diagram showing light from the scene attenuated by the second system, which is comprised of a linear polarizer with a vertical transmission axis. It also shows the image formation of the second system.

FIG. 4 is a diagram showing light from the scene attenuated by the fourth system, which is comprised of a retarder whose fast axis is horizontal and by a linear polarizer with a transmission axis at an angle $\theta=45$ degrees relative to the horizontal direction. It also shows the image formation of the fourth system.

FIG. 5 is a diagram showing light from the scene attenuated by the third system, which is comprised of a linear polarizer with a transmission axis oriented at an angle $\theta=45$ degrees relative to the horizontal direction. It also shows the image formation of the third system.

DETAILED DESCRIPTION

Figure 1:
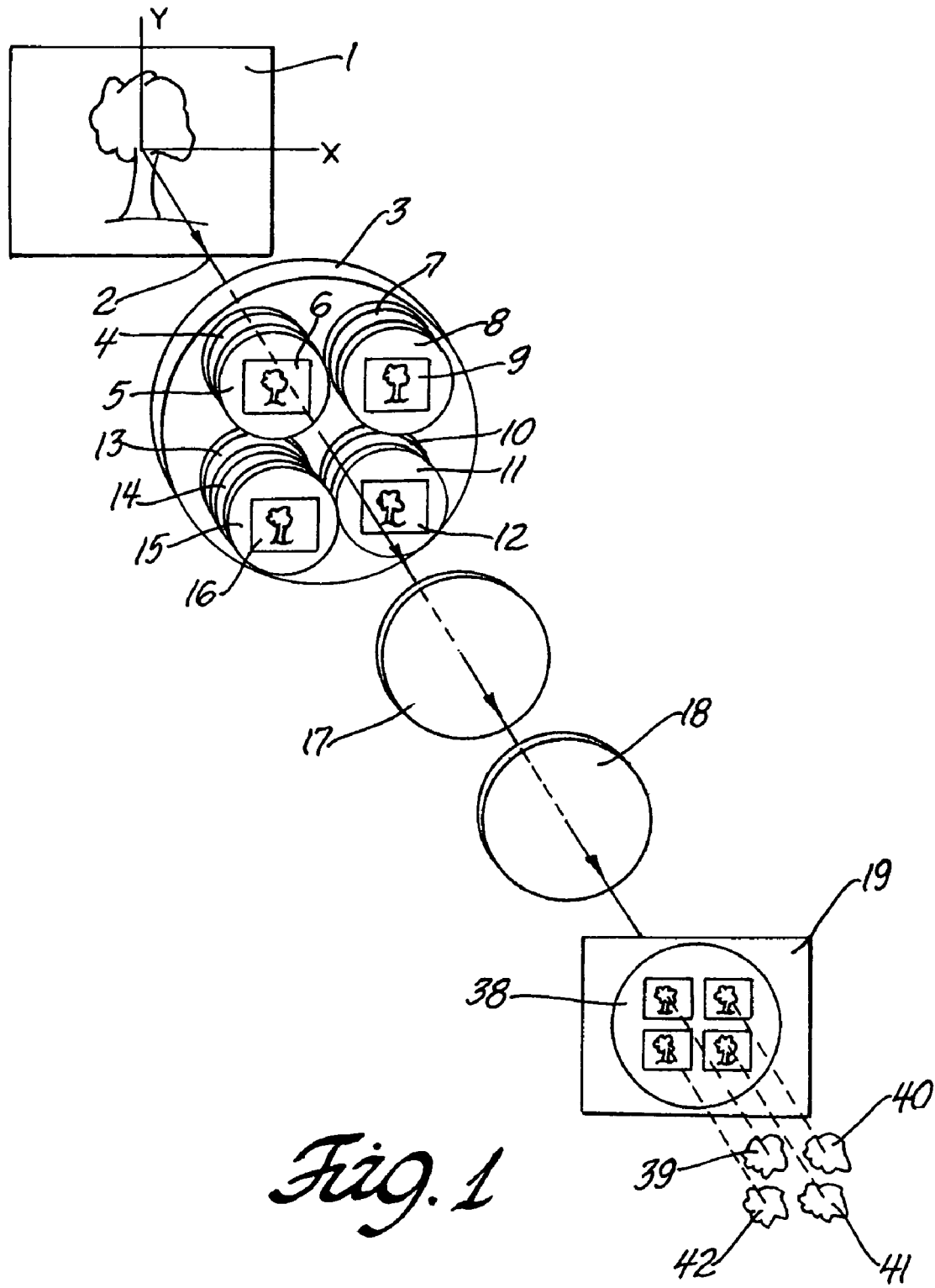
FIG. 1 is a diagram of light rays traveling from a scene through an optical array having four optical systems, each system creating an independent image operating according to our method.

FIG. 1 shows elements of one acceptable design for an array 3 that simultaneously creates four different attenuated images 6, 9, 12 and 16 of scene 1. The component systems of optical elements in array 3 that attenuate light from scene 1 and create images 6, 9, 12 and 16 of scene 1 are shown individually in FIGS. 2 through 5. Some of the light from scene 1 passes through planes $x_1$-$y_1$, $x_2$-$y_2$, $x_3$-$y_3$ and $x_4$-$y_4$ in FIGS. 2, 3, 5 and 4, respectively. In these figures the variously subscripted x and y axes all lie in the same plane, the x-axes are all parallel to each other and the y-axes are all parallel to each other.

It will be noted that FIGS. 7 through 13 depict various views of our pseudo-color version of a Poincarè sphere. These figures, due to US Patent Office regulations, must be in black and white. However, it will be understood that our Poincarè sphere contains the colors red, blue, green and blends of these colors. In FIGS. 7 through 13, zones of our version of the Poincarè sphere that are primarily red, blue or green are designated by reference letters R, G and B, respectively.

FIG. 2 shows light that passes through the $x_1$-$y_1$ plane, such as ray 20, and is transmitted through and attenuated by linear polarizer 4 that has its transmission axis 21 oriented at an angle θ with respect to the $x_1$-axis and the $x_1$-$z_1$ plane, θ being 0° in FIG. 2, such that axis 21 lies along axis $x_1'$. The exiting attenuated light, such as ray 22, is then transmitted through imaging lens 5, which forms attenuated image 6 of scene 1. FIG. 3 shows light that passes through the $x_2$-$y_2$ plane, such as ray 24, and is transmitted through and attenuated by linear polarizer 7 that has its transmission axis 25 oriented at an angle θ with respect to the $x_2$-axis and the $x_2$-$z_2$ plane, θ being 90° in FIG. 3, such that axis 25 lies along axis $y_2'$. The exiting attenuated light, such as ray 26, is then transmitted through imaging lens 8, which forms attenuated image 9 of scene 1.

FIG. 5 shows light that passes through the $x_3$-$y_3$ plane, such as ray 28, and is transmitted through and attenuated by linear polarizer 10 that has its transmission axis 29 oriented at an angle θ with respect to the $x_3$-axis and the $x_3$-$z_3$ plane, θ being 45° in FIG. 5, where axis $x_3'$ is parallel to axis $x_3$. The exiting attenuated light, such as ray 30, is then transmitted through imaging lens 11, which forms attenuated image 12 of scene 1.

FIG. 4 shows light that passes through the $x_4$-$y_4$ plane, such as ray 32, and is transmitted through and attenuated by retarder 13 that has its fast axis 33 oriented at an angle Ω with respect to the $x_4$-axis and the $x_4$-$z_4$ plane, Ω being 0° in FIG. 4, such that axis 33 lies along axis $x_4'$. Retarder 13 causes a phase difference ε between components of any given light wave passing through the system, ε having a different value for different wavelengths. The retarder may be of any anisotropic material. Specifically, the following relationship exists for a quarter-wave plate made of quartz:

$$\varepsilon = \frac{\pi}{2}\left(\frac{\lambda_T - 50.876}{\lambda - 50.876}\right) \quad (1)$$

where λ is any visible wavelength and $\lambda_T$ is that wavelength which produces ε=π/2, sometimes called the tuned wavelength. This relation is further discussed in U.S. Pat. No. 5,734,473 noted above. The exiting attenuated light, such as ray 34, is then transmitted through and attenuated by linear polarizer 14 that has its transmission axis 35 oriented at an angle θ with respect to the $x_4$-axis and the $x_4$-$z_4$ plane, θ being 45° in FIG. 4, where axis $x_4''$ is parallel to axis $x_4$. The exiting attenuated light, such as ray 36, is then transmitted through imaging lens 15, which forms attenuated image 16 of scene 1.

Light from images 6, 9, 12 and 16, such as rays 23, 27, 31 and 37 (FIGS. 2, 3, 5 and 4, respectively) are transmitted through a color filter 17 (FIG. 1), which selects a given bandwidth, the average of which becomes λ in equation (1) above. The exiting light from color filter 17 is transmitted through a camera lens 18, which forms a collective image 38 of the scene images 6, 9, 12 and 16 on the CCD array 19.

Image 38 is downloaded into a computer and a computer program crops selected corresponding elements from each of the four scene images. Scene image 6 is cropped to form image 39, scene image 9 is cropped to form image 40, scene image 12 is cropped to form image 41 and scene image 16 is cropped to form image 42. The pixel values of image 39 form the matrix $M_1$, the pixel values of image 40 form the matrix $M_2$, the pixel values of image 41 form the matrix $M_3$ and the pixel values of image 41 form the matrix $M_4$.

Since the Stokes parameters require intensity (I) measurements and the CCD array records RGB (red, blue and green) pixel values (X), a relationship between X and I must be obtained for the CCD array. One calibration method of obtaining this relationship is to pass an incident beam of collimated light of known intensity through neutral density filters of different known optical densities (Y) and record the average X for each Y. Alternatively, instead of using an incident beam of known intensity, one may measure the intensity of the beam exiting the neutral density filter. Curve-fitting yields Y as a function of X, $$Y=f(X). \quad (2)$$

Since some CCD detectors are multi-channel arrays, a relationship between X and Y must be obtained for each channel.

Optical density is related to intensity through the equation $$I=10^{-Y} \quad (3)$$

Substituting equation (2) into equation (3) yields the CCD calibration equation $$I=10^{-f(X)} \quad (4)$$

Using equation (4), each pixel value, X, in each of the matrices $M_1$, $M_2$, $M_3$ and $M_4$ can be converted to an intensity value producing the new matrices $I_2$, $I_2$, $I_3$ and $I_4$ respectively.

The four Stokes parameters, $S_0$, $S_1$, $S_2$ and $S_3$, are then derived from the elements of the four intensity matrices $I_1$, $I_2$, $I_3$ and $I_4$ as follows:

$$S_0 = I_1 + I_2 \quad (5)$$
$$S_1 = I_1 - I_2$$
$$S_2 = 2\ I_3 - S_0$$
$$S_3 = \frac{2\ I_4 - S_0 - S_2 \cos\varepsilon}{\sin\varepsilon}$$

Each of the elements in the matrices $S_0$, $S_1$, $S_2$ and $S_3$ correspond to a particular point in scene 1. For example, corresponding elements $s^{(0)}_{11}$, $s^{(1)}_{11}$, $s^{(2)}_{11}$ and $s^{(3)}_{11}$ from the four Stokes parameter matrices are associated with a point (x,y) in scene 1. Therefore, the polarization state of any point (x,y) in scene 1 can be determined from $$\sin 2\chi = \frac{S_3}{\sqrt{S_1^2 + S_2^2 + S_3^2}} \quad (6)$$
$$\tan 2\psi = \frac{S_2}{S_1}$$
$$P = \frac{\sqrt{S_1^2 + S_2^2 + S_3^2}}{S_0}$$

where $\chi$ is the polarization ellipticity angle, $\psi$ is the polarization azimuth angle and P is the degree of polarization.

Figure 6:
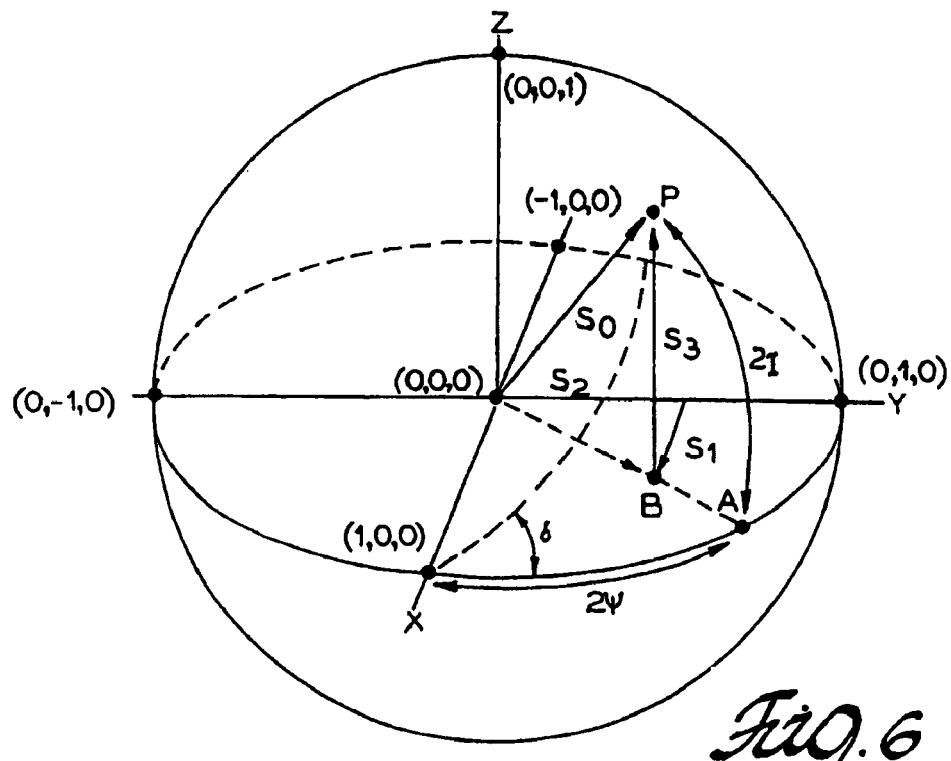
FIG. 6 is a diagram of the Poincarè sphere. The center of the sphere is the origin of a rectangular Cartesian coordinate system. The sphere has a unit radius. Every polarization state is associated with a unique point in or on the sphere. The normalized Stokes parameters are represented by the x, y and z coordinates of a point on or inside of the sphere. Points inside the sphere correspond to partially polarized light, points on the surface of the sphere correspond to light that is completely polarized.
Figure 7:
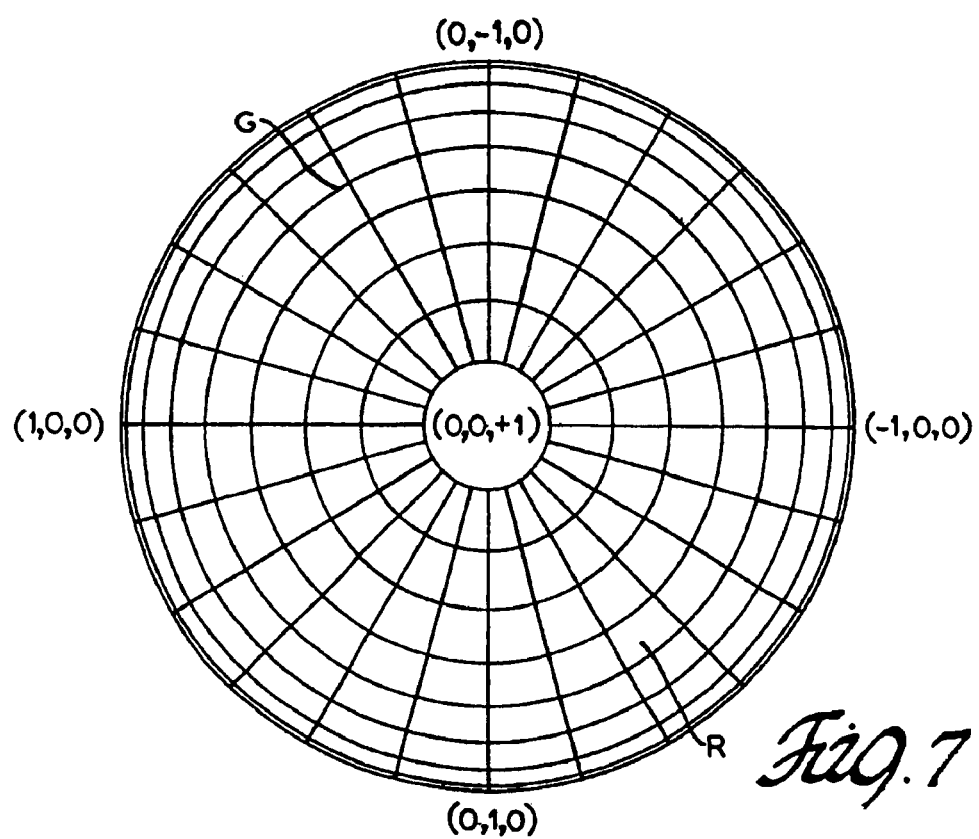
FIG. 7 shows a pseudo-color visualization of the surface of the Poincarè sphere when viewing the sphere along the +z axis.
Figure 8:
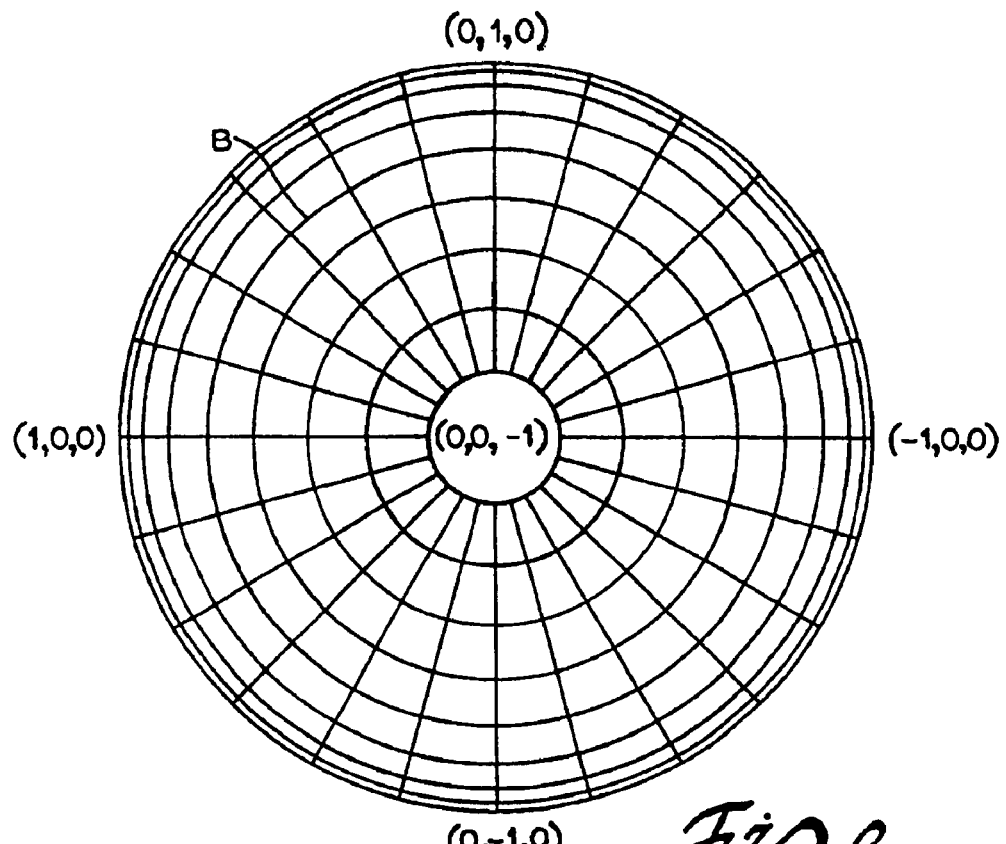
FIG. 8 shows a pseudo-color visualization of the surface of the Poincarè sphere when viewing the sphere along the −z axis.

In addition to the above technique, we have invented a unique scheme that utilizes the Poincarè sphere (FIG. 6) for encoding and displaying polarization parameters in a scene. In this scheme, the normalized values of the Stokes parameters are obtained by dividing $S_0$, $S_1$, $S_2$ and $S_3$ by $S_0$. As shown in FIG. 6, the parameters $S_1$, $S_2$ and $S_3$ correspond to the x, y and z coordinates of points inside or on of the surface of the sphere respectively. Points inside the sphere correspond to partially polarized light (0<P<1), whereas points on the surface of the sphere correspond to light that is totally polarized with P=1.

The Stokes parameters are then encoded in a scene by assigning RGB (red, blue and green) values to the normalized values of $S_1$, $S_2$ and $S_3$ at each pixel site in the scene as follows:

$$R=\text{int}[127.5(1-S_1)],\ G=\text{int}[127.5(1-S_2)] \text{ and } B=\text{int}[12.75\ (1-S_3)] \quad (7)$$

Where "int" is the integer function. Converting each pixel of a scene in accordance with equation 7 will result in a color map of the scene which characterizes the polarization of any selected area therein. For example, a given area A of the scene may have unpolarized light, where $S_1=S_2=S_3=0$. Unpolarized light corresponds to middle gray (R=G=B=127) at the center of the Poincarè sphere, and thus area A will be a middle grey color on the aforementioned color map. Likewise, in general, any unpolarized or weakly polarized light is middle gray or unsaturated in the primary colors.

A method of encoding only P, the degree of polarization, is to covert each pixel of a scene into a corresponding 8-bit digital representation by the equation pixel value=255 P Encoding the pixels in this manner will produce a monochrome or grey-scale image, wherein the black areas correspond to light that has zero polarization, the white areas correspond to light that is 100 percent polarized, and areas of varying shades of grey correspond to light having varying degrees of polarization.

Figure 13:
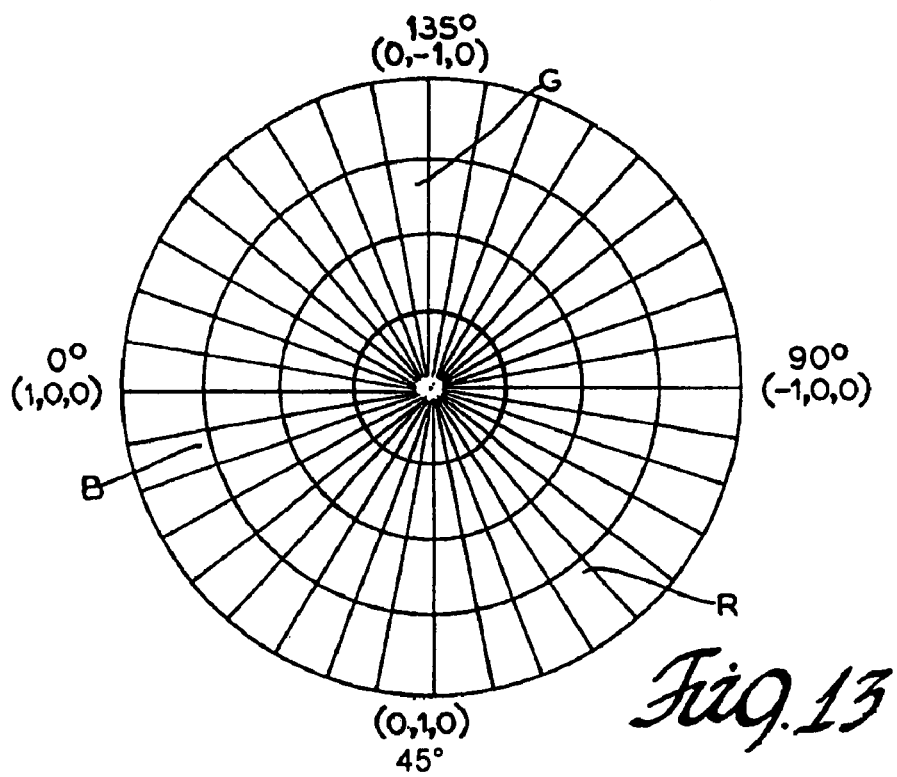
FIG. 13 shows the pseudo-coloring of the horizontal, equatorial plane of the Poincarè sphere. The colors along the perimeter of this plane are used to encode azimuth and ellipticity polarization angles in a scene.
Figure 9:
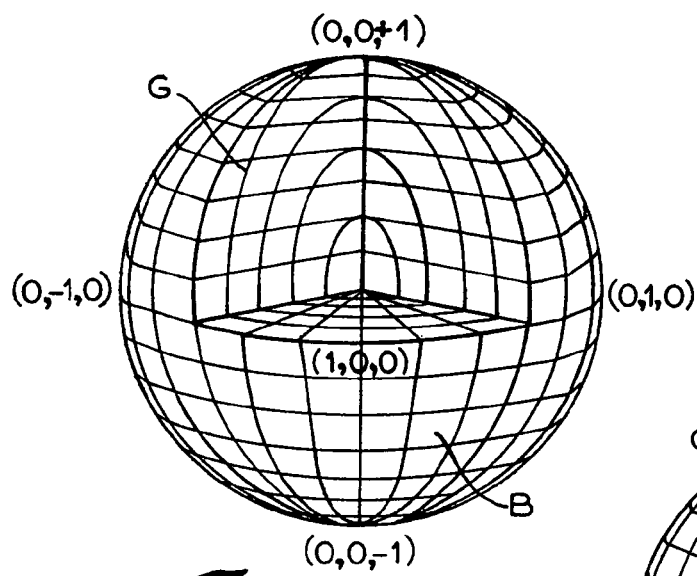
FIG. 9 shows a pseudo-color visualization of the surface and partial interior of the Poincarè sphere when viewing the sphere along the +x axis.
Figure 10:
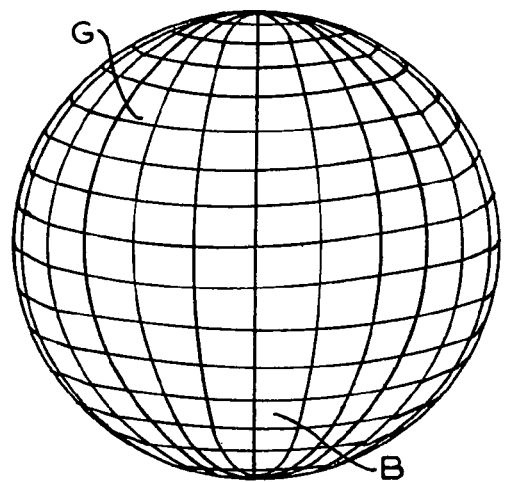
FIG. 10 shows the relationship between the polarization forms, the corresponding pseudo-colors and the corresponding location on the Poincarè sphere when viewing the sphere along the +x axis.
Figure 11:
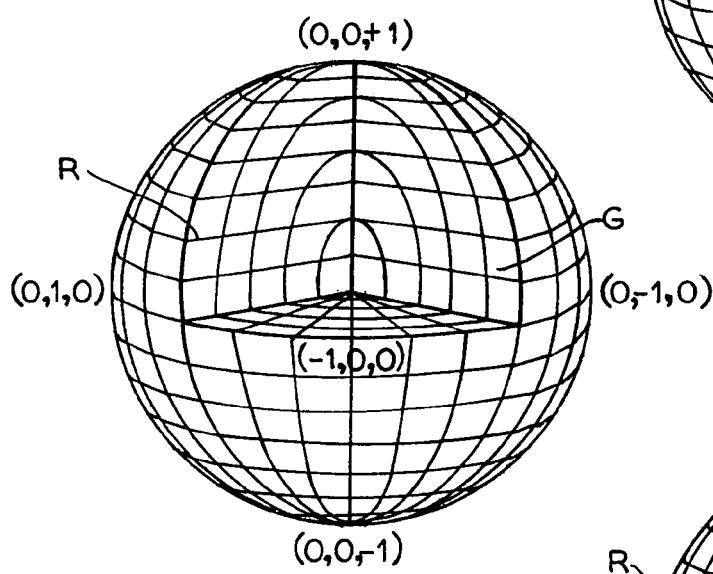
FIG. 11 shows a pseudo-color view of the surface and partial interior of the Poincarè sphere when viewing the sphere along the −x axis.
Figure 12:
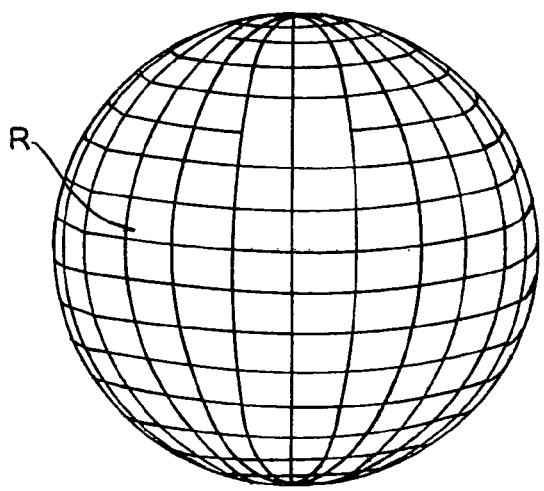
FIG. 12 shows the relationship between the polarization forms, the corresponding pseudo-colors and the corresponding location on the Poincarè sphere when viewing the sphere along the −x axis.

Still other options in our scheme assign RGB values to the azimuth polarization angle or assign RGB values to the ellipticity polarization angle. Both of these angles are essential parameters when desiring to represent a complete polarization profile. A method of displaying either one these angles for each pixel in a scene is to assign a different color to each specific size of that angle. The polarization azimuth angle, $\psi$, assumes values from 0 to 180 degrees while the ellipticity angle, $\chi$, varies from −45 to 45 degrees. The ellipticity angle is positive for right-handed polarization and negative for left-handed polarization. FIG. 13 shows the pseudo-coloring of the horizontal, equatorial plane of the Poincarè sphere. We use the colors along the perimeter of this plane to encode azimuth and ellipticity polarization angles in a scene. Each color along the perimeter of this cross-section of the Poincarè sphere corresponds to a unique combination of a $\psi$-value and a $\chi$-value.

The spherical polar coordinates for any point on or inside the Poincarè sphere is given by $$S_1=P \cos 2\chi \cos 2\xi\ S_2=P \sin 2\chi \cos 2\xi\ S_3=P \sin 2\xi \quad (9)$$

where $x=S_1$, $y=S_2$, $z=S_3$, P (the degree of polarization) is the radius of the sphere and the origin of a Cartesian coordinate system is at the center of the sphere. For points along the perimeter of the equatorial plane of the Poincarè sphere P=1 and $\chi=0$. Using P=1 and $\chi=0$ and substituting equation (9) into equation (7) yields $$R=\text{int}[127.5(1-\cos 2\psi)],\ G=\text{int}[127.5(1-\sin 2\psi)] \text{ and } B=12$$

Equation (10) contains the RGB values used to encode the $\psi$-values into a scene. Substituting $\chi$ for $\psi$ in equation (10) produces $$R=\text{int}[127.5(1-\cos 2\chi)],\ G=\text{int}[127.5(1-\sin 2\chi)] \text{ and } B=127 \quad (11)$$

Equation (11) contains the RGB values used to encode the $\chi$-values into a scene.

We do not desire to be limited to the exact details of construction or method shown herein since obvious modifications will occur to those skilled in the relevant arts without departing from the spirit and scope of the following claims.

The invention claimed is:

1. A method for determining and representing in real time the polarization profile of a scene, comprising:
   providing four systems having light attenuating optical elements;
   simultaneously sending rays of light incoming from the scene through all the systems, thereby creating four sets of attenuated rays;
   passing the sets of attenuated rays through a color filter;
   passing the sets of attenuated rays to a camera CCD array which forms an image of each of the sets of rays, each of the images having a matrix of pixel values, wherein a given pixel value in one of the images has corresponding pixel values in all others of the images and wherein corresponding sets of pixel values relate to same points in the scene;

calibrating a mathematical relation between the pixel values and intensity values;

converting the matrices of the pixel values to matrices of the intensity values;

using the matrices of intensity values to derive matrices of Stokes parameters S0, S1, S2, and S3;

for selected points in the scene, deriving a set of calculated values for one or more of P, $\Psi$ or $\chi$, where P is the degree of polarization, $\Psi$ is the polarization azumith angle and $\Psi$ is the polarization ellipticity angle;

converting one or more of the sets of the calculated values into eight bit digital representations; and for one or more of the sets of the calculated values, using the eight bit representations to create a grey scale representation of the selected points of the scene.

2. The method of claim 1 wherein:

the four systems are a first, second, third and fourth optical element set;

the first system comprises a first linear polarizer whose transmission axis is oriented at an angle θ1 with an x1-z1 plane along which the incoming light passes;

the second system comprises a second linear polarizer whose transmission axis is oriented at an angle $\theta_2$ with an x2-z2 plane along which the incoming light passes;

the third system comprises a third linear polarizer whose transmission axis is oriented at an angle $\theta_3$ with an x3-z3 plane along which the incoming light passes;

the fourth system comprises a retarder whose fast axis is oriented at an angle $\Omega$ with an x4-z4 plane along which the incoming light passes;

the fourth system further comprising a fourth linear polarizer whose transmission axis is oriented at an angle $\theta_4$ with the x4-z4 plane.

3. The method of claim 1 wherein the step of calibrating the mathematical relation comprises:

passing a beam of collimated light through neutral density filters of different known optical densities and recording the pixel value for each known intensity value for the collimated light; and curve fitting to yield the optical density, Y, as a function of the pixel value, X, to obtain a function f(X); and substituting f(X) for Y in the equation $I=10^{-Y}$, where I is the intensity.

* * * * *